United States Patent
Barua et al.

(10) Patent No.: US 10,397,749 B1
(45) Date of Patent: Aug. 27, 2019

(54) SYSTEMS AND METHODS FOR DETECTION, IDENTIFICATION, AND USE OF ENVIRONMENTAL AUDIO SIGNATURES

(71) Applicant: Sprint Communications Company L.P., Overland Park, KS (US)

(72) Inventors: Abhik Barua, Overland Park, KS (US); Michael A. Gailloux, Overland Park, KS (US); Vanessa Suwak, Kansas City, MO (US)

(73) Assignee: Sprint Communications Company L.P., Overland Park, KS (US)

(*) Notice: Subject to any disclaimer, the term of this patent is extended or adjusted under 35 U.S.C. 154(b) by 70 days.

(21) Appl. No.: 15/808,731

(22) Filed: Nov. 9, 2017

(51) Int. Cl.
| | |
|---|---|
| G06F 3/16 | (2006.01) |
| H04W 4/02 | (2018.01) |
| H04W 4/06 | (2009.01) |
| H04W 4/18 | (2009.01) |
| H04W 4/30 | (2018.01) |
| H04W 4/33 | (2018.01) |
| G10L 25/51 | (2013.01) |
| H04W 4/021 | (2018.01) |
| H04W 4/029 | (2018.01) |

(52) U.S. Cl.
CPC ............ H04W 4/029 (2018.02); G10L 25/51 (2013.01); H04W 4/02 (2013.01); H04W 4/021 (2013.01); H04W 4/06 (2013.01); H04W 4/30 (2018.02); G06F 3/16 (2013.01); G06F 3/167 (2013.01); H04W 4/185 (2013.01); H04W 4/33 (2018.02)

(58) Field of Classification Search
CPC ....... H04W 4/02; H04W 4/021; H04W 4/029; H04W 4/043; H04W 4/06; H04W 4/185; H04W 4/30; H04W 4/33; H04W 4/40
USPC ................... 700/94; 455/404.2, 414.2, 456.1
See application file for complete search history.

(56) References Cited

U.S. PATENT DOCUMENTS

| | | | | |
|---|---|---|---|---|
| 5,210,820 A | * | 5/1993 | Kenyon | G06K 9/00496 704/200 |
| 8,868,223 B1 | * | 10/2014 | Sharifi | G06F 16/683 700/94 |
| 9,460,201 B2 | * | 10/2016 | Anniballi | G06F 16/638 |
| 9,984,168 B2 | * | 5/2018 | Memon | H04W 4/021 |

* cited by examiner

*Primary Examiner* — Jesse A Elbin

(57) ABSTRACT

A system for identifying audio signatures from user equipment based on a plurality of transmissions from a plurality of user equipment (UE). Each transmission of the plurality of transmissions comprises an audio signature, a geolocation of the audio signature, and a timestamp of the audio signature. The identification of audio signatures may be used to identify a geolocation of a UE or UEs based on geohashed areas. This identification may be further employed to determine whether the UE is in a location that permits data transmission, and to either transmit data to the UE based on a determination that the UE is in a location that permits data transmission, or not transmitting data the UE is associated with a DO NOT SEND state or if a location type associated with the geohashed area and the timestamp is associated with the DO NOT SEND state.

18 Claims, 7 Drawing Sheets

SYSTEMS AND METHODS FOR DETECTION, IDENTIFICATION, AND USE OF ENVIRONMENTAL AUDIO SIGNATURES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices contain microphones and speakers that are employed for purposes including voice-to-text applications, streaming content, and recording and playing audio. In some cases, mobile communication devices may be coupled to peripheral devices that enhance audio effects such as speakers or video projectors.

SUMMARY

In an embodiment, a system for identifying audio signatures from user equipment is disclosed. The system comprises an application stored in a non-transitory memory of a server and executable by a processor. The application, when executed, receives a transmission from a user equipment (UE), wherein the transmission comprises an audio signature, a geolocation of the audio signature, and a timestamp of the audio signature, wherein the audio signature has a beginning, an end, and an overall length. The application is further configured to select a portion of the audio signature that is less than the overall length of the audio signature; and generate, for the portion of the audio signature, over a frequency range, a plurality of counts of instances when the portion of the audio signature fell within each frequency range segment of a plurality of range segments within the frequency range. In the embodiment, the application is further configured to rank the plurality of range segments based on a count associated with each range segment; determine, based upon the rank of counts of instances for the plurality of range segments, if the portion of the audio signature corresponds to an audio tag of a plurality of stored audio tags, wherein each audio tag of the plurality of audio tags is associated with at least one of a location type, a geohashed area, or a vendor. The application is further configured to store, based upon the determination that the portion of the audio signature corresponds to an audio tag, the association between the at least one of the location type, the geohashed area, or the vendor and the UE.

In an embodiment, a method is disclosed. The method comprises receiving, by an application stored in a non-transitory memory of a server and executed by a processor, a plurality of transmissions from a plurality of user equipment (UE), wherein each transmission of the plurality of transmissions comprises an audio signature, a timestamp of the audio signature, and a geolocation of the audio signature. He method further comprises selecting, by the application, a portion of the audio signature, wherein the portion of the audio signature corresponds to a predetermined time period and analyzing, by the application, the portion of the audio signature to determine a plurality of counts of frequency instances for a plurality of range segments within a frequency range. The method further comprises, based on the analyzing, ranking, by the application, the plurality of range segments from a first range segment associated with a highest count of frequency instances to a second range segment associated with a lowest count of frequency instances. In the embodiment, the method further comprises determining, via a comparison by the application, based upon the ranking, if the UE is in a location that permits data transmission; and transmitting, by the application, based on a determination that the UE is in a location that permits data transmission, a plurality of data.

In an embodiment, an alternate method for transmitting data based on audio signatures from user equipment is disclosed. The method comprises receiving, by an application stored in a non-transitory memory of a user equipment (UE) and executed by a processor, a plurality of transmissions from a plurality of user equipment (UE), wherein each transmission of the plurality of transmissions comprises an audio signature, a geolocation of the audio signature, and a timestamp of the audio signature. The method further comprises determining, based on the geolocation of the audio signature, when the UE is within a previously stored geohashed area and determining, based on the determination that the UE is within a previously stored geohashed area, if the UE is associated with a DO NOT SEND state or if a location type associated with the geohashed area and the timestamp is associated with the DO NOT SEND state. The method further comprises selecting, subsequent to a determination that neither the UE nor the location type is associated with a DO NOT SEND state, content to transmit to the UE, wherein selecting comprises determining if content from a plurality of vendors stored in a data store is associated with the geohashed area, a vendor within the geohashed area, or a different geohashed area within a predetermined distance of the UE; and transmitting the selected content to the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
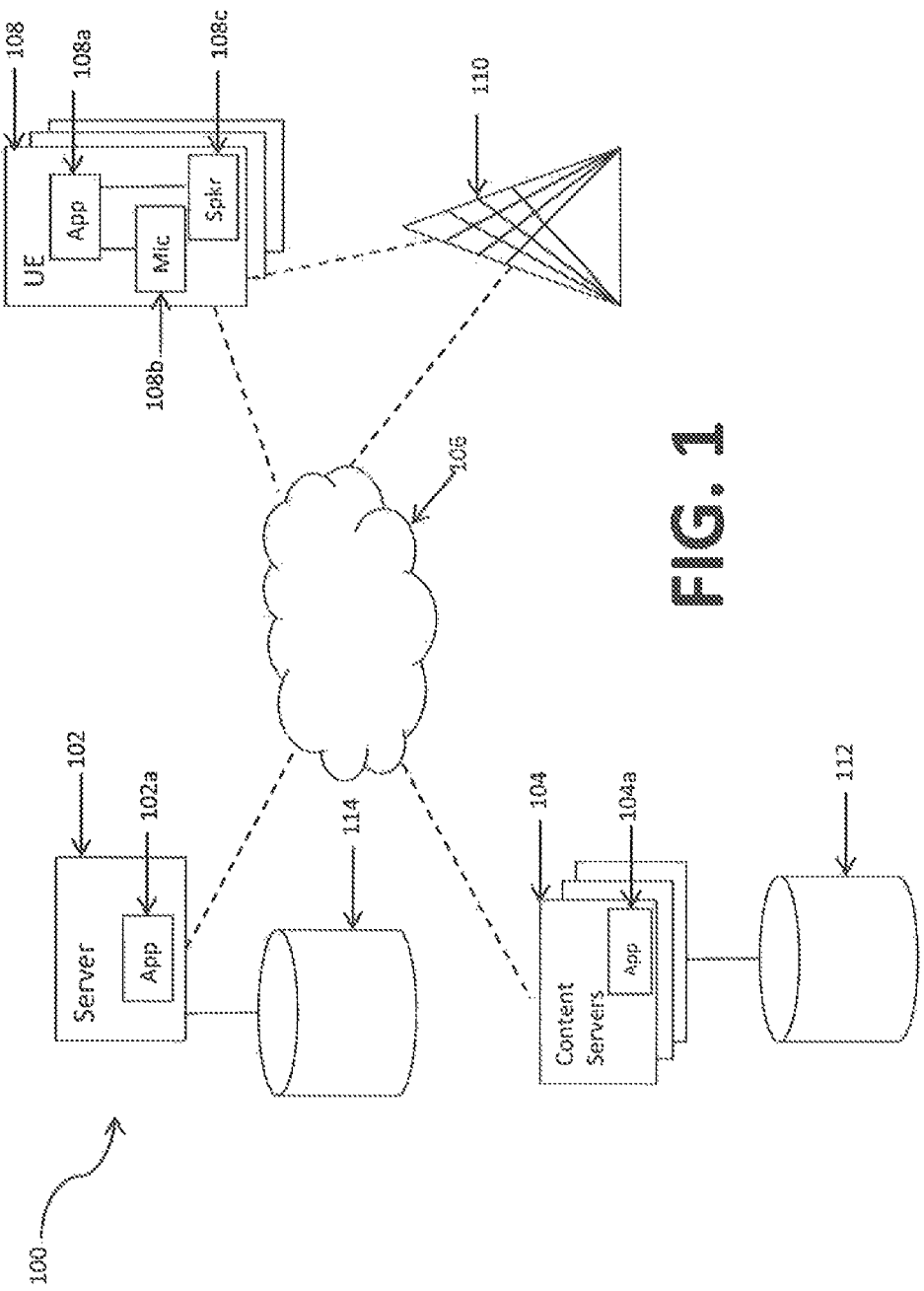
FIG. 1 is a schematic illustration of a system for environmental analysis and environment-based content transmission according to certain embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches capturing audio by a microphone of a mobile communication device and transmitting that audio back to a server computer for audio analysis. This audio analysis can determine if a distinguishing audio signature or audio tag is present in the audio environment where the mobile communication device is located. Such a distinguishing audio signature, for example, may be periodically transmitted at a point of interest (POI, e.g., a coffee shop, a grocery store, a car dealership). For example, a data store of associations of audio signatures or audio tags to POIs may be maintained, and the server computer may search the data store using the audio signature it has analyzed as present in the captured audio clip. Detection of the audio signature by the analysis of the audio at the server supports the inference that the mobile communication device is present at the POI associated with that audio signature or audio tag, which in turn can be used to trigger some other action, for example to send an advertisement or coupon associated with the POI to the mobile communication device or to launch a location specific application on the mobile communication device. The distinguishing audio signature can be in a frequency range which is inaudible to human beings, for example at a frequency above 20 KHz. The distinguishing audio signature may be identical in all the locations of a given business (i.e., only distinguish the business but not the specific location). Alternatively, the distinguishing audio signature may be different at different locations of a given business (i.e., distinguishing both the business and the specific location, for example a specific coffee shop location of a chain of coffee shops).

This information can further be used for analyzing and determining customer traffic flow at different POIs or different locations by businesses. That information in turn can be used to inform bidding exchanges for mobile advertisements based on mobile communication devices being in that location.

The audio analysis can further determine an audio profile or characteristic of the audio environment. For example, different audio environments may have different characteristics: the presence of human voices, the lack of human voices; the sound of glasses clinking, the absence of glasses clinking; television audio in the background, the absence of television audio in the background. This audio profile or characteristic may be used to identify a kind of location, such as a sports bar, a rowdy restaurant, a sedate restaurant, a library, and other types of locations. This information may then be used along with metadata coupled to the captured audio by the mobile communication device and sent by the mobile communication device to the server computer. This metadata can include location information and date-time information. The location information may be GPS coordinates of the mobile communication device. The location information may be an identity of a cell site from which the mobile communication device receives wireless coverage (i.e., an identity of a cell site can serve as a proxy for a coarse physical location of the device). After accumulating a knowledge base through analysis of audios from a plurality of mobile communication devices, the server may create a geographic or geohash map of an area that designates zones associated with entertainment activities, zones associated with grocery stores, zones associated with schools, for example. Later, knowing that a mobile communication device is in one of these areas and knowing, based on the analysis of audios, that the subject area is associated with a specific activity (entertainment, grocery shopping, school activities) the subject mobile communication device may be sent unsolicited content that is selected based on the specific activity characteristic of the given area.

The analysis of the audio can perform a frequency analysis of the audio clip sent by the mobile communication devices. This can characterize the amount of energy or power in the audio in each of a plurality of frequency bands (i.e., a spectral analysis of the audio frequencies). This can include frequency bands that are too high for human beings to hear. The audio analysis can further identify zero crossings of the audio clip and when those zero crossings occur. The audio analysis can further determine a spectral flatness figure of merit for the subject audio, which can provide a measure of how much the audio resembles white noise (e.g., a lack of signal content) or how much the audio differs from white noise.

These different audio analysis results can be stored along with the metadata coupled to the audio clip. It is noted that these analysis results can be more compact than the raw audio clip data. Additionally, the mobile communication device may be sending a plurality of audio clips from the same location for about the same period of time (e.g., every minute sending a 2 second audio clip for the duration of a one hour visit to a rowdy restaurant), and the analysis server may combine or average these audio results to create a single audio characteristic associated with that mobile communication device with that specific location and date-time as indicated in the metadata coupled to the audio clip. Thus, this system may store a single audio result that represents the combination of the results of analysis of the plurality of audio clips sent to the server computer from the same mobile communication device while it continues to be located at one location. This single audio result may represent hundreds of audio clips from the mobile device, which can provide a considerable reduction of volume of storage needed to store the audio results versus the amount of storage that would have been needed to store all the audio clips. Additionally, processing time is saved by analyzing the audio clips once and storing the audio results, versus having to reanalyze the audio clips each time information is desired.

Various types of user equipment (UE) such as tablets, laptops, smart phones, personal digital assistants (PDA), and wearable technologies are equipped with two-way microphones that may detect sounds from users and from the environment of the users, and the UEs may interpret these audio signals into text and/or commands. This technology may be used to identify users via a voice signature, and transmit content and/or provide a user access to portions of a device or capabilities of a device based upon a comparison of the voice signature to a previously stored signature that is associated with a user.

Using the systems and methods discussed herein, an environment may be determined via a plurality of audio events which may be referred to as audio signatures that are recorded and transmitted by various user equipment (UE) to a server. These audio signatures may be analyzed, alone or in conjunction with geolocation and timestamp information associated with when the audio signatures were recorded in the environment, to determine a location or a location type of the UE, as well as a state of the UE which may comprise a SEND or DO NOT SEND state, as discussed further below. Applications discussed herein may distinguish sound as compared to background noise ("noise"), and may use the background noise in the form of an audio signature to generate a plurality of audio tags associated with general and specific (brand) locations. An "audio signature" as used herein is used to mean a recording of noise or sound that may be within and/or outside of a human hearing range. The system may use these audio signatures to detect and distinguish human sounds from environmental noise such as machinery, weather, animals, music, alerts, and other audio events. An "audio tag" as used herein may refer to a link between an audio signature or a portion of an audio signature and a brand-name location, geohashed area, and/or location type. In some embodiments, audio tags may be associated with a SEND or DO NOT SEND indication.

In some embodiments, the system may analyze a portion or a plurality of portions of an audio signature to determine if the audio signature corresponds to one or more stored audio tags. Based on this comparison, an inference may be made that a UE is in a location based on the recognized audio tags and/or a geolocation and a time stamp from an audio signature from a UE determine where the UE is located. This determination of a location may be a specific vendor or a geohashed area that may or may not be associated with a location type and/or a DO NOT SEND indication. This DO NOT SEND indication may be employed to determine if a UE is to be associated with a DO NOT SEND state, where certain content may not be transmitted to the UE but where background applications may continue to push geolocation and other information to a server, as discussed in detail below.

As used herein, a "geolocation" may be a location as determined by native data or longtitude/latitude, and a geohash or geohashed area, discussed below, comprises a polygon-shaped area that encompasses a plurality of geolocations. Geolocations may be obtained by software, hardware, or a combination thereof on the UE that may employ triangulation among and between cell towers to determine a location of a UE. In some embodiments, discreet geohashed areas may have differing but overlapping geometries. In alternate embodiments, a first shape of a geohashed area that may be tied to activity in that area may change to a second, different shape, based upon a time of day, a day of the week, a month of the year, or combinations of various measures of time. This may be the case, for example, in areas with seasonal activity like ski areas or beach areas, or in areas like entertainment districts or sports arenas.

An application on the system may, in some embodiments, determine, based on the audio tags or on a previously stored association between a geolocation/geohashed area, if content is permitted to be pushed at that location. In some embodiments, this determination may additionally be based on a time or time range in that geohashed area that may be tied to a DO NOT SEND indication or flag. The application may further determine what type of content is linked to the geohashed area and/or a brand associated with the geolocation and/or time. Examples of content associated with geohashed areas include transportation (ride services and/or ride sharing services), weather (alerts), existing business closures, new business openings, or content associated with financial institutions, which may include offers for gift card purchase from a financial institution that may be used at a plurality of vendors in the geohashed area.

In an embodiment, a plurality of audio tags may be identified from an audio signature and stored in order to determine location types (entertainment district) and/or specific locations (Acme Grocery). These stored audio tags may serve as the basis for the analysis discussed herein, and may be added to, for example, when audio signatures are analyzed and corresponding tags are not found by the application. This may be the case when a UE is in an area of construction where previously none existed, or in a new entertainment or business district that may have been previously associated with rural or residential areas or location types. Audio tags may be associated with audio signatures of less than 25 KHz and may include background noise not identified by human hearing. In another embodiment, an audio signature may be analyzed independently of the stored audio tags, and sometimes in conjunction with a time stamp and/or a geolocation associated with the recording of the audio signature.

Thus, in contrast to systems that may transmit content based upon user profiles stored on a mobile device or on a remote server, the systems and methods discussed herein are configured to at least (1) store a plurality of audio tags associated with brand locations; (2) store a plurality of geohashed areas; (3) associate at least some of the geohashed areas with a location type; (4) further associate at least some of the geohashed areas with a time, day of the week, or other time-based range and location type such that a single geohashed area may be associated with two or more location types based on the time of day, day of the week, month, and/or combinations thereof. In some embodiments, these analyses using the tags and/or audio signature in conjunction with the geolocation and time stamp may be employed to transmit content and/or obtain feedback from users in geohashed areas.

In an embodiment, based on a geolocation within a geohashed area or based upon identification via the audio tags, a determination may be made as to whether the UE is in a location and/or at a time in that location when content may be pushed. A DO NOT SEND indication may be associated with some audio tags and/or geohashed locations and those indication may be further associated with a time of day. For example, if a UE is determined to be in a geohashed area associated with a location type of "business district" during the day and "entertainment district" at night, different content may be transmitted during different windows of time based upon the location type associated with the geohashed area during that time period. In another example, if an audio tag or tags are associated with a hospital or medical district, those audio tags may be associated with DO NOT SEND states. In some embodiments, an application that determines a UE is in a DO NOT SEND location via geohashed areas and location types or via audio tags may transmit a message to the subject UE after a predetermined period of time to request another audio signature and again analyze the audio signature to determine if the UE is now in a location where content is available and may be pushed. This iterative analysis may occur over a predetermined time period along a plurality of evenly or unevenly spaced time intervals, and, in some embodiments, may ultimately result in the content being transmitted but, for example, with a "silent" notification after the expiration of the predetermined time period.

In an embodiment, a geolocation of a UE (e.g., a triangulated position of longitude and latitude or other coordinates) may be associated with a geohashed area that is associated with a location type. These location types may comprise entertainment, academic, transportation (mass transportation or individual transportation based on road/motor noise), sports, education, business, religious, volunteer, public land, or other location types. Each location type may be associated with a SEND or DO NOT SEND state, and, in some embodiments, a geohashed area and a location type may be linked and associated with either or both types of states based upon time of day, day of week, month of the year, or combinations thereof. For example, a geolocation may be associated with a geohashed area that is associated with a location type of "entertainment" and a time stamp that indicates it is an entertainment area during weekends and evenings. The same geohashed area may be associated with a location type of "business" during weekdays.

In another example, if a UE is determined to be in a vehicle, for example, based on a determination that the audio signature is associated with a vehicle and that the UE is moving faster than a predetermined speed such as 5 miles per hour (mph) or 10 mph, this may be associated with a "transportation" location type and a DO NOT SEND state, and content may not be transmitted. The determination that the UE is moving may be based upon a GPS-based analysis, a speedometer application stored on the UE and in communication with the application, or via other hardware or software on the UE designed to transmit location, speed, and/or relative location information to the application. In some examples, if a DO NOT SEND state is temporarily associated with the UE, content may not be transmitted as discussed above. In other examples, other functionalities of the UE such as texting, voice calling, or other functionalities may be restricted based upon the DO NOT SEND state's association with the UE.

In another example, a plurality of audio signatures may be analyzed concurrently or consecutively and, depending upon the results of that analysis, a plurality of content may be pushed to multiple UEs within a geohashed area based on the audio signature analysis and independently of any profiles or other behavioral histories of the subject UE. In some examples, a WiFi network associated with a UE may be transmitted along with an audio signature and may be used for further identification. It is to be appreciated that the sound and noise data discussed herein is anonymized, that is, it is stored without being associated with a customer, customer profile, or other identifying details.

In an embodiment, an analysis may be performed on a seconds-long audio signature to parse the audio signature into shorter portions than the overall audio signature that are further analyzed. This analysis produces results regarding the frequency ranges and bands of ranges and does not analyze the content (words) of the audio signature but rather analyzes, for example, via a spectral flatness analysis, to determine if the audio signature has been previously associated with a location type based upon an analysis of at least a portion of the audio signature in conjunction with the geolocation and time stamp. Spectral flatness analysis, discussed below, may be used to determine the presence of audio sound (as opposed to white noise) in various frequency bands across the portion of the audio signature. In one example, a portion at the beginning of the audio signature is analyzed, then a portion from approximately the middle of the audio signature and/or a portion from the end of the audio signature.

Turning back to the analysis of a portion of an audio signature, this analysis may be executed along millisecond sections of the portion of the audio signature and may be in "tick mark" format, e.g., if the milliseconds of the portions are reviewed, is there a noise/sound from 1 KHz-2 KHz? Is there a noise/sound from 3 KHz-4 KHz? If so in either case, how long is that sound present for within that range? A signal count for each frequency band may be generated in this manner. These counts may be ranked from a frequency band with a highest number of counts to that with the lowest of counts. In some embodiments, the portion of the audio signature may be evaluated using a spectral flatness analysis to determine how many times over a predetermined time period (the same as or less than the total time of the portion of the audio signature) the audio signature crosses an x-axis that indicates white noise. In some examples, a location of these crossings may be determined and stored as well.

In the examples discussed above, if the application determines that the UE is in a SEND location (or rather, not in a DO NOT SEND location), the application may determine what type of content is available for transmission. This may include the application communicating with a remote database or plurality of databases, or with an internal server where content is periodically pushed from vendors and stored.

In some embodiments, the application may analyze an audio signature and determine that a particular brand is associated with the audio signature. This may be based upon a stored association between an audio signature and the vendor. The audio signature may be created by the vendor to be unique to that vendor, and in some cases to be outside a range of human hearing. The audio signature may be transmitted to UE at and/or within proximity to that vendor. In one example, a vendor may register with a paid service, for example, with a telecommunications service provider in order to register the audio signature to the vendor. A registered vendor may have content transmitted to UEs determined to be in a geohashed area and not associated with a DO NOT SEND state (e.g., the UE is determined to not be in a moving vehicle passing by). This content may include discounts, offers, giveaways, or other promotions or links to promotions associated with the registered vendor's location. This content may be further based upon a geolocation of the UE since there may be different offers for, for example, a mountain town in January and a beachside southern town in January.

FIG. 1 is a schematic illustration of a system 100 for environment-based content transmission according to embodiments of the present disclosure. In the system 100, a server 102 comprising an application 102a is in communication with a data store 114 as well as a network 106 that enables communication between the server 102 and a plurality of content servers 104 and user equipment (UE) 108. Each UE of the plurality of UE 108 comprises an application 108a stored in a non-transitory memory (not shown) of the UE 108 and executable by a processor (not shown) to receive information from and send information to an audio input device 108b such as a microphone 108b and an audio output device 108c such as a speaker 108c of the UE 108. The data store 114 comprises a plurality of rules associated with when transmissions including alerts, texts, voicemails, voice calls, and other content are permitted to be transmitted to the UEs 108. These rules may be associated with geolocations such as railroad tracks, hospitals, courthouses, schools, and other locations where content transmission may pose a health or safety risk to the user or may not otherwise be permitted due to local or federal regulations. The health and safety risks posed may be the result of a distraction caused by a transmission of content. The data store 114 may also store a plurality of audio signatures associated with both specific locations (Bob's Burgers) and generic locations (nightclubs).

These audio signatures may be generated and stored based upon the microphone 108*b* detecting background noise when the UE in a particular location and the application 108*a* has been triggered/activated. It is to be understood that the application 108*a* may remain active in a monitoring mode in the background in a "sleep" or other mode when a decibel level of the surrounding environment drops below a predetermined level. In some embodiments, the application 108*a* may deactivate such that it is not in a monitoring mode after a predetermined period where the decibel level of the surrounding environment drops below a predetermined threshold. The application 108*a* may be triggered (activated into a monitoring state) manually by a user, or at predetermined intervals that correspond to periods of increased device use, or via a signal from an audio beacon or from other noise that activates the application and initiates the recording and/or transmission of audio signatures. An audio "beacon" is a term used herein to refer to a dedicated device that transmits unique and identifiable audio signatures along a predetermined schedule to a plurality of UE within a predetermined range of the audio beacon. These unique audio signatures may be associated with particular brands and/or locations of brands. In some embodiments, a plurality of audio signatures may be recorded via the application 108*a* and stored on the UE 108 initially prior to transmitting the audio signatures to the server 102.

The microphone 108*b* may be configured to detect background noise such as musical notes, volume of noise, frequency of noise, modulation, noise type (human voices or applause, animal, machine). This background noise may be from a known geolocation such as a business district, an entertainment district, an airport, and/or a school. This information may be transmitted by the application 108*a* via the network 106 and a base transceiver station (BTS) or plurality of BTS 110 to the application 102*a* to create a relationship between an audio signal or a plurality of audio signals and a geolocation/geohashed area. This relationship is stored in the data store 114 and later employed when a UE 108 detects an audio signature and transmits it to the application 102*a* for analysis so that the application 102*a* can determine if content is permitted to be pushed based upon the rules stored in the data store 114, as discussed in further detail below.

In an embodiment, the plurality of content servers 104 may each be associated with retailers, emergency services, travel vendors, and other entities that may desire to push content to the plurality of UE 108 based upon a geolocation determined by the collection and analysis of audio signatures based upon previous identification of audio signatures and/or the previous association of a geolocation with a location type such as entertainment, academic, transportation (mass transportation or individual transportation based on road/motor noise), sports, business, religious, volunteer, public land, or other location type. Using the systems and methods discussed herein, the application 102*a* may determine at least whether content from the content servers 104 may be transmitted. The content transmitted may thus be determined at least in part by audio signatures received from the UE 108, e.g., by a geolocation of the device as well as SEND or DO NOT SEND indications that may be associated with the related geohashed area or subject UE(s).

Figure 2:
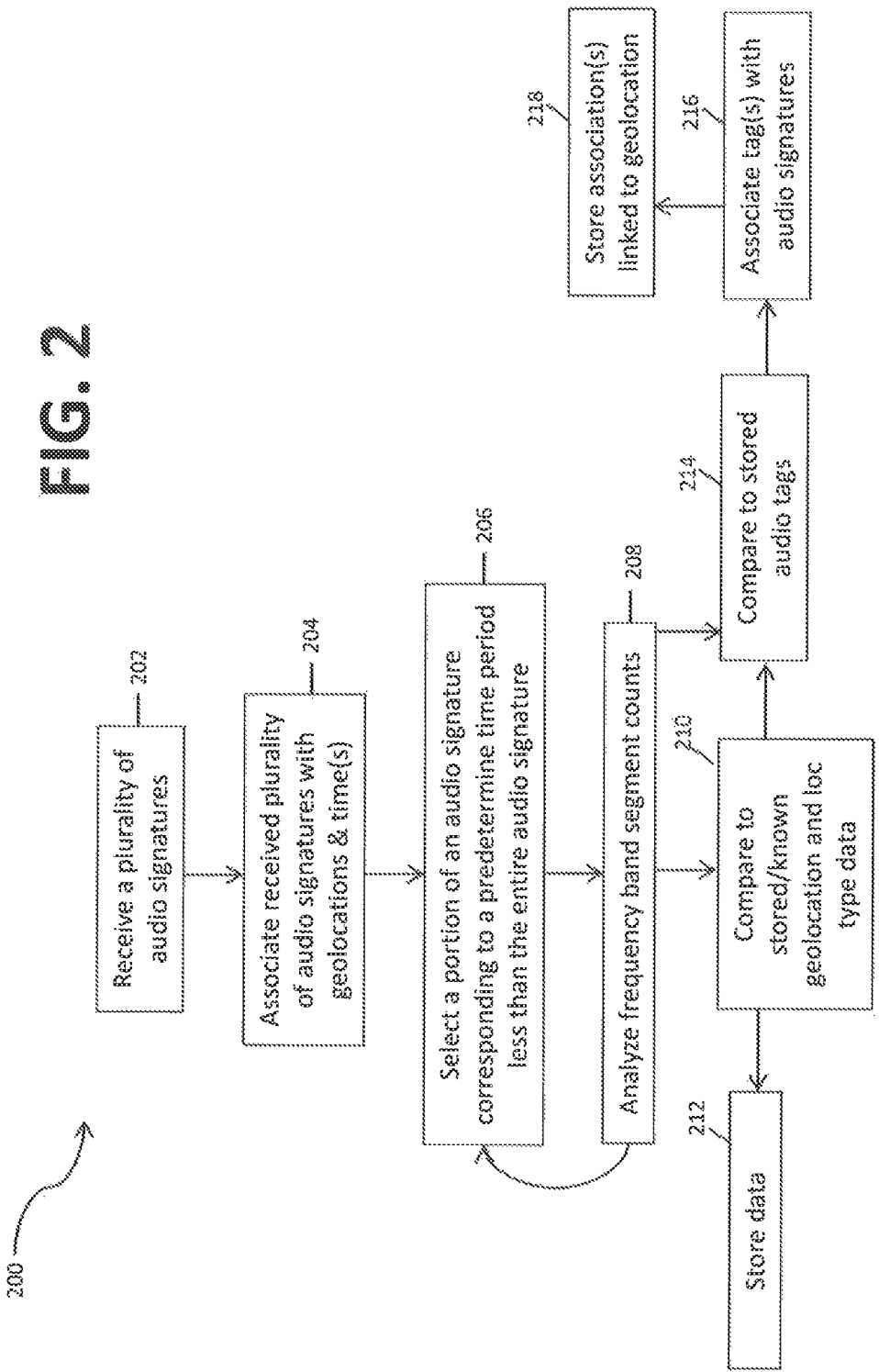
FIG. 2 is a flow chart of a method of associating audio environments with location types and vendor locations according to certain embodiments of the present disclosure.

FIG. 2 is a method 200 of associating environmental signatures with location types and vendor locations. At block 202 of the method 200, a server receives a plurality of audio signatures from a plurality of UEs. Each audio signature of the plurality of audio signatures received at block 202 may be associated with a timestamp and a geolocation. This timestamp may comprise a range of time and/or a day of the week. The link between the audio signature and each timestamp and geolocation is stored in a data store at block 204 for further processing at subsequent blocks of the method 200. For example, at block 206, a portion of an audio signature, for example, a 2-second portion of a 10-second clip, is analyzed. In alternate embodiments, this portion may be longer or shorter than 2 seconds, and subsequent portions, that may be sequential or non-sequential to the first portion selected at block 206, may be further analyzed depending upon the results discussed herein.

In an embodiment, at block 208, the portion selected at 206 may be analyzed to determine which frequency bands the portion falls into. For example, a range of human hearing may be considered to be 20 Hz to 20 KHz, and UEs may record noise from less than 1 Hz or less to up to 20 KHz or more, where levels below 20 Hz may be considered to be outside of the human range of hearing. In this example, the analysis at block 208 may comprise breaking the portion into 1 KHz-5 KHz increment bands, and an application may generate a count of how many times the selected portion of the audio signature falls within a first increment, a second increment, and so on. In other examples, the increment bands may be less than 1 KHz, for example, 0.333 KHz or 0.5 KHz, or may be greater than 3 KHz, such as 4 KHz, 5 KHz, and so on. The analysis may be performed on the selected portion of the audio signature, which may be in second or millisecond increments.

Further at block 208, once the counts are determined, the counts are ranked to determine which frequency increment band or bands have the highest count. In some embodiments, further portions of the audio signature may be selected at block 206 and analyzed at block 208. These further cycles of analysis of additional portions of the audio signature may be based upon a determination by the application that there is not sufficient discretion (for example, when there is no highest single count due to a two-or-more-way tie between counts) between frequency band range count to select a "highest" count, or based upon a rule associated with the geolocation and/or time that specifies analysis of at least two portions of the audio signature.

In some embodiments, the determination and analysis at block 208 includes a spectral flatness analysis. This analysis may be performed to determine the white noise content of the selected portion. The spectral flatness analysis may be used to determine sound (voice speech) from background noise (non-voice speech) by determining how many times and at what intervals (time periods in between crossings) the audio signature of the portion crosses a threshold. In particular, spectral flatness may be used to determine this distinction by analyzing a portion of an audio file to determine the white noise content of an audio signature. The size of the frequency increment bands used at block 208 may be adjusted and re-adjusted among and between the analysis of audio signature portions. The spectral flatness analysis evaluates a number of times that the portion crosses the threshold, in this case an x-axis which may be referred to as the "white noise" threshold. The application may analyze not only how many times the selected portion or portions' audio crosses the x-axis, but also where in the portion these instances occur. That is, this may be used to differentiate the ringing of a clock tower bell from another sound within the same frequency band increment based upon a number of occurrences and a time between each pair of occurrences of the number of occurrences.

The analysis at block 208 may generate results including a highest count of instances of the portion of audio signature in a particular frequency interval band, a count and associated total time of "0" crossings of the x-axis, (e.g., what periods of time there was white noise), and a spectral flatness analysis. At block 210, the application may compare the results of the analysis at block 208 and the geolocation associated with the audio signature to determine whether a location type was previously associated with the geolocation. At block 212, if the application determines that the audio signature and geolocation were not previously stored and/or were not associated with a location type or with a location type that corresponds to the audio signature and/or timestamp, the data received at block 202 may be stored for future use in the methods discussed herein.

In some embodiments, subsequent to the analysis at block 208, the results of the analysis may be compared to a plurality of audio tags at block 214. The plurality of audio tags may have been previously recorded and stored and associated with a location type or a specific location. In one example, company X registers with a service plan that enables at least one audio signature to be associated with company X and content related to company X. This audio signature may be broadcast in or near company X's location or locations, as well as at complimentary locations of businesses that may be vertically aligned with company X (e.g., a juice bar may have an audio beacon at its location and/or at a nearby fitness center). At block 216, the audio signature may be associated with the audio tag or tags found based upon the comparison at block 214, and those associations may be stored at block 218 for later use, for example, as discussed in the method 300. In some examples, the association at block 216 may include whether the audio tag or tags is associated with a DO NOT SEND indication.

Figure 3:
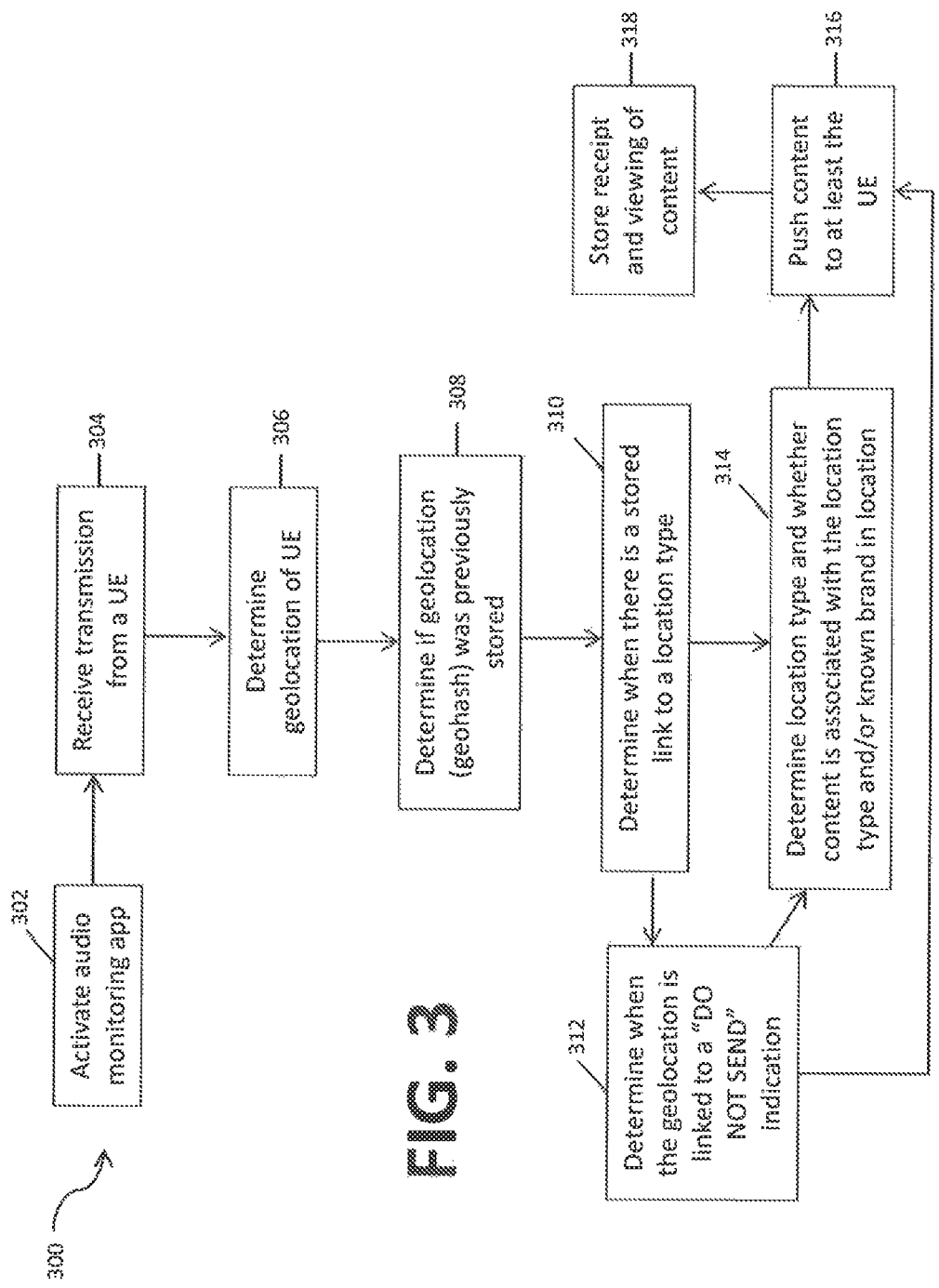
FIG. 3 is a flow chart of a method of transmitting content based on audio signatures and geolocations according to certain embodiments of the present disclosure.

FIG. 3 is a flow chart of a method 300 of transmitting content based on audio signatures and geolocations according to certain embodiments of the present disclosure. In the method 300, at block 302, an audio monitoring application stored on a UE is activated. This may also be referred to as the phone "waking up." The audio monitoring application may be in communication with a speaker and/or a microphone or other hardware, software, and/or peripheral devices associated with the UE. This activation at block 302 may occur based upon a transmission from a remote server, a manual activation by a user, or on a predetermined schedule. For example, the application may be configured to request audio signatures from a plurality of UEs on a schedule at block 302 to determine if the UEs are in entertainment districts on a weekend evening, or in a sporting district along a schedule corresponding to a sports team or other event or schedule of events that may have been previously transmitted to the application.

At block 304, a server receives an audio signature from an activated audio monitoring application on a UE, such as the UE discussed at block 302. The audio signature is received by the application from the UE at block 304 along with a geolocation and a time stamp of when the audio signature was recorded. At block 306, an application on the server determines a geolocation of the UE based upon the geolocation of the audio signature. The geolocation may comprise a geohash, which is a geocoding system employed to divide geographic areas into polygonal shaped areas, so the geolocation of the audio signature indicates a location (longitude and latitude or other format) within a geohashed area where the audio signature was recorded. At block 308, subsequent to determining a geolocation of the UE at block 306, the application compares the geolocation and audio signature to a plurality of stored geohashes and audio signatures to determine if the geolocation has been previously stored. This information may have been previously generated and stored such that a plurality of geohashed areas are associated with a location type and, in some instances, further associated with a time or time range (hour of the day, day of the week, month, etc.) and indication of movement of the UE.

In an embodiment, at block 310, in response to a determination at block 308 that the geolocation associated with the audio signature has been previously stored, the application determines if a location type has been previously associated with the geolocation based upon previously analyzed audio signatures. Location types may have been previously associated with a geohash/geolocation based upon a method similar to the method 200 of FIG. 2 and may comprise entertainment, academic, transportation (mass transportation or individual transportation based on road/motor noise), sports, business, religious, volunteer, public land, or other location types. These types may vary among and between hours of the day, days of the week, and months of the year for the same geohashed area. In some embodiments, the application at block 310 may determine if there are links to location types of surrounding geohashed areas if none are found for the geolocation determined at block 306.

In an embodiment, at block 312, the application may determine if the geolocation and location type is linked to a "DO NOT SEND" indication. In some embodiments, this determination at block 312 may be based on additional information from the transmission at block 304 that includes speedometer results or based upon a determination at block 306 that the UE is associated with more than one geohashed area during the time period when the audio signature was recorded. In one example, if the application at block 312 determines that the UE moved more than a predetermined distance per time of the audio signature, this may indicate the UE is in a moving vehicle and the application would associate the UE with a DO NOT SEND state.

In another example, if the geolocation is associated with a geohashed location of religious institutions or court houses, it may be linked to a DO NOT SEND state such that, while the UE is in that geohashed area, content may not be transmitted. That is not to say that the UE would not function in an emergency capacity or via background application while in this area, but rather that the content discussed herein will not be transmitted under those circumstances. If it is determined at block 312 that the location type determined at block 310 is associated with a DO NOT SEND state, a flag may be associated with that UE and a second audio signature may be analyzed at blocks 306-310 and 312 to determine if the UE remains in the location that caused the association with the DO NOT SEND state after a predetermined amount of time. This may be repeated for a number of cycles or for a total predetermined period of time, after which the content may be transmitted at block 316.

If the application at block 312 determines that the geolocation and associated geohash are associated with a location type that permits content transmission, at block 314 the application determines, based upon the location type, if there is stored content associated with the location type (e.g., ride services for entertainment and sports location types), a particular brand in the geohashed location, or if other alerts or notifications from, for example, the telecommunications service provider are desirable. At block 316, as discussed above, content is pushed to at least the UE, and in some embodiments, to other UEs associated with the same service plan and/or customer address as the UE that transmitted the audio signature. At block 318, a plurality of data captured by the UE(s) to which the content was transmitted at block 316 is transmitted to the server and stored. This plurality of data comprises the content transmitted, if and when the message was viewed, if and when content accessed via the message is viewed, as well as whether subsequent transactions were completed by the UE based on the content transmission.

Figure 4:
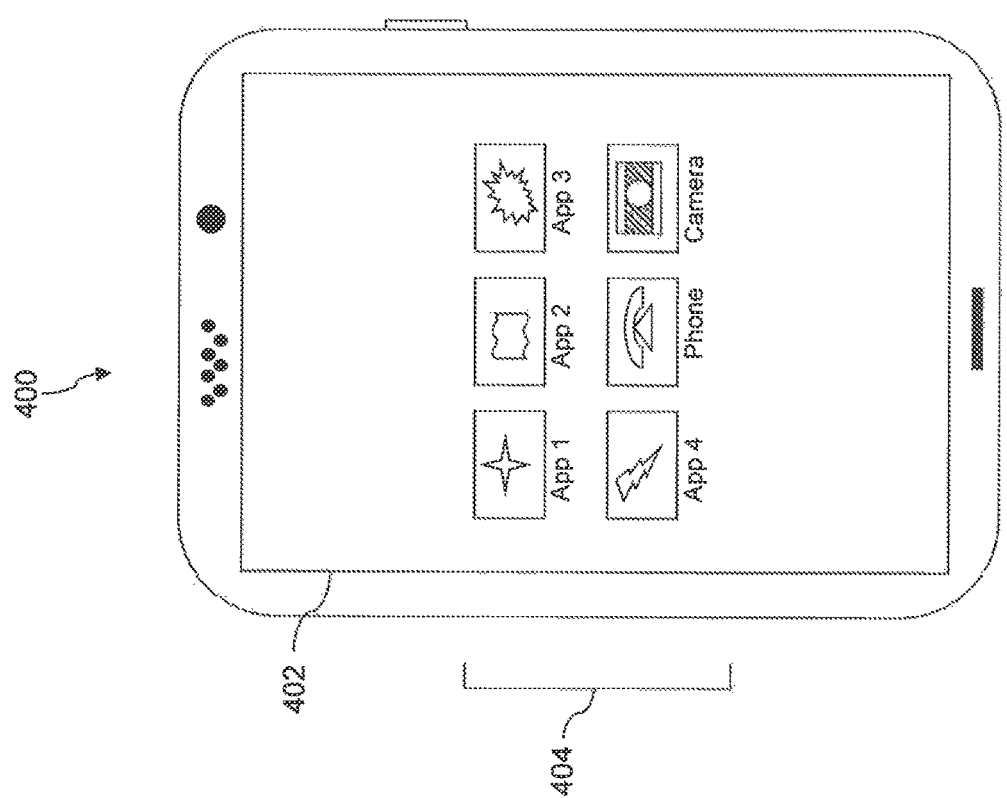
FIG. 4 depicts the user equipment (UE), which is operable for implementing aspects of certain embodiments of the present disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, a media player, a wearable computer, or a headset computer. In an embodiment, wearable technology may comprise devices incorporated into accessories as well as technology permanently or semi-permanently coupled to a person or persons, including but not limited to jewelry, footwear, eyewear, and medically implanted technology. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
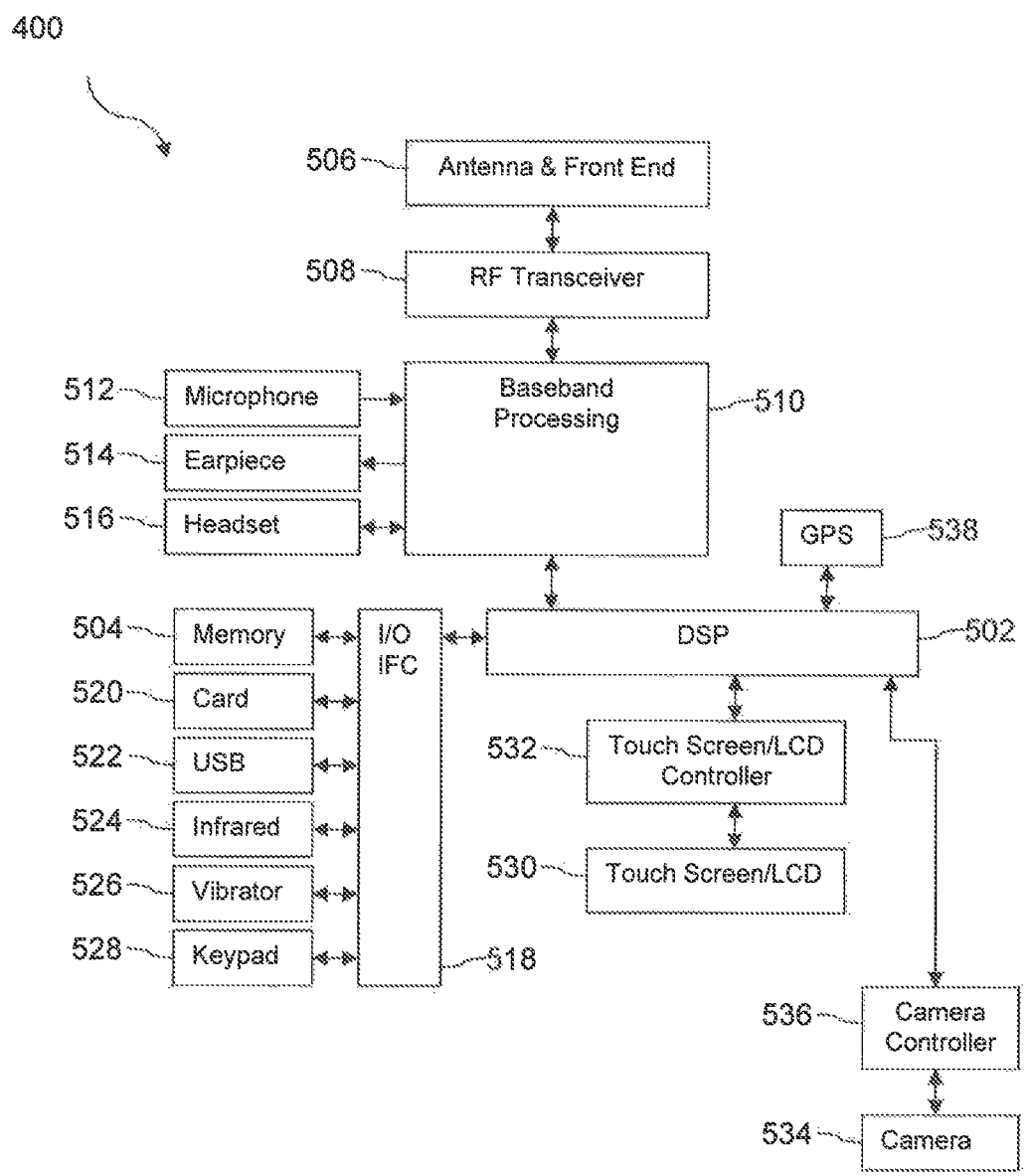
FIG. 5 shows a block diagram of a UE which is operable for implementing aspects of certain embodiments of the present disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
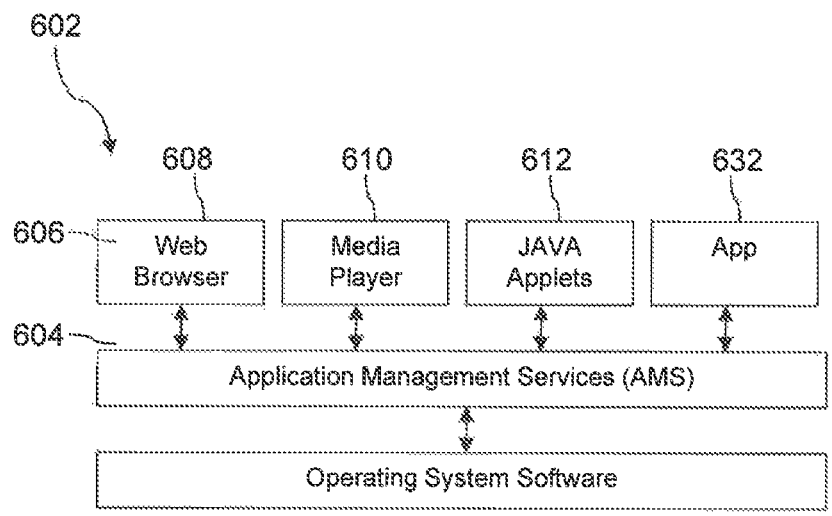
FIG. 6A illustrates a software environment that may be employed to implement certain embodiments of the present disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In one embodiment, an application 632 may be stored on the UE and configured to transmit audio signatures, geolocation data, timestamp data, and relative motion data via communication with the java applets 612 and/or the microphone 512, earpiece 514, or other components of the UE as discussed in FIG. 5. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
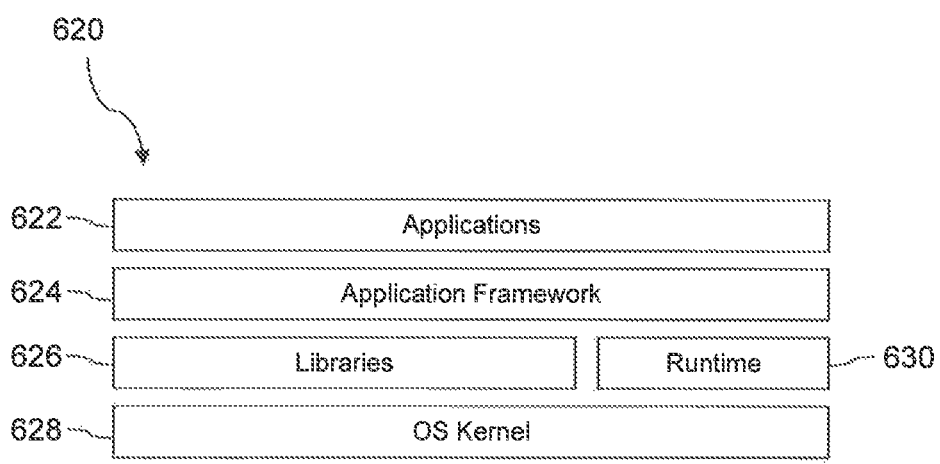
FIG. 6B illustrates an alternative software environment that may be employed to implement certain embodiments of the present disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
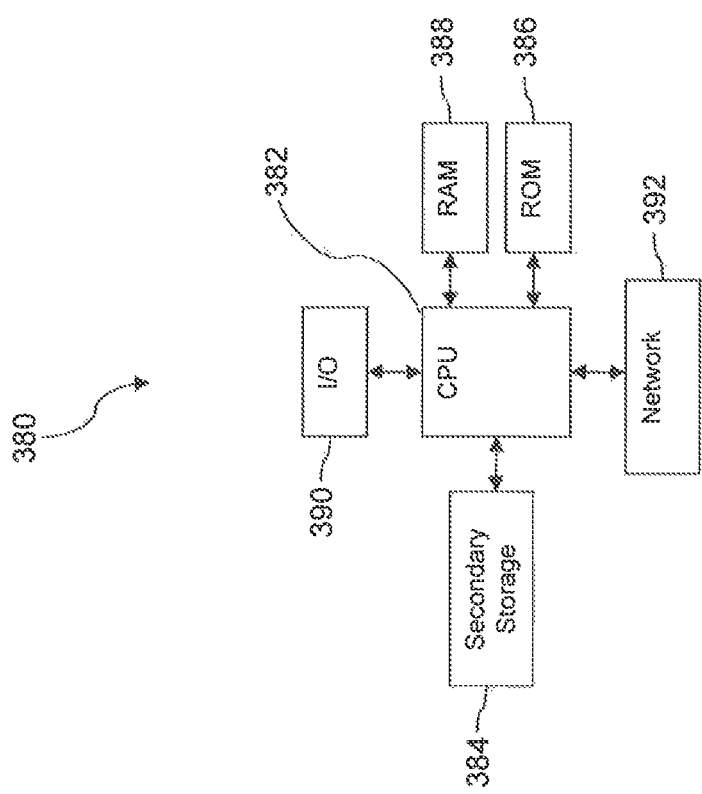
FIG. 7 illustrates a computer system suitable for implementing one or more embodiments disclosed herein.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for identifying audio signatures from user equipment, comprising:
an application stored in a non-transitory memory of a server and executable by a processor to:
receive a transmission from a user equipment (UE), wherein the transmission comprises an audio signature, a geolocation of the audio signature, and a timestamp of the audio signature, wherein the audio signature has a beginning, an end, and an overall length;
select a portion of the audio signature that is less than the overall length of the audio signature;
generate, for the portion of the audio signature, over a frequency range, a plurality of counts of instances when the portion of the audio signature fell within each frequency range segment of a plurality of range segments within the frequency range;
rank the plurality of range segments based on a count associated with each range segment;
determine, based upon the rank of counts of instances for the plurality of range segments, if the portion of the audio signature corresponds to an audio tag of a plurality of stored audio tags, wherein each audio tag of the plurality of audio tags is associated with at least one of a location type, a geohashed area, or a vendor;
store, based upon the determination that the portion of the audio signature corresponds to an audio tag, the association between the at least one of the location type, the geohashed area, or the vendor and the UE;
determine a SEND or DO NOT SEND state associated with the UE and determine a SEND or DO NOT SEND state associated with the location type; and
transmit data to the UE if the states are SEND, or block transmission of data to the UE if one or more of the states are DO NOT SEND.

2. The system of claim 1, wherein the portion is about two seconds in duration.

3. The system of claim 1, wherein the frequency range is from 1 Hz to 40 KHz.

4. The system of claim 1, wherein each frequency range segment is in 1 KHz, 2 KHz, 5 KHz, or 10 KHz.

5. The system of claim 1, wherein the application is further configured to receive, from the UE, subsequent to transmitting the data, an indication as to whether the data was viewed.

6. The system of claim 1, wherein the application is further configured to receive, from the UE, subsequent to transmitting the data, a message as to whether the data was viewed within a predetermined time period.

7. The system of claim 1, wherein the application is further configured to receive, from the UE, subsequent to transmitting the data, a message as to whether additional content was viewed based upon the transmitted data.

8. The system of claim 1, wherein the determination that the portion of the audio signature corresponds to an audio tag is further based on the geolocation of the transmission.

9. A met hod performed by an application stored in a non-transitory memory of a server and executed by a processor, the method comprising:
receiving a plurality of transmissions from a plurality of user equipment (UE), wherein each transmission of the plurality of transmissions comprises an audio signature, a timestamp of the audio signature, and a geolocation of the audio signature;
selecting a portion of the audio signature, wherein the portion of the audio signature corresponds to a predetermined time period;
analyzing the portion of the audio signature to determine a plurality of counts of frequency instances for a plurality of range segments within a frequency range;
based on the analyzing, ranking the plurality of range segments from a first range segment associated with a highest count of frequency instances to a second range segment associated with a lowest count of frequency instances;
determining, via a comparison, based upon the ranking, if the UE is in a location that permits data transmission by:
determining if the geolocation is associated with a stored geohashed area; and
subsequent to determining that the location is associated with the stored geohashed area, determining if a location type of the stored geohashed area is associated with a SEND or DO NOT SEND state and determining if the UE was previously associated with a SEND or DO NOT SEND state; and
transmitting data to the UE if the states are SEND, or blocking transmission of data to the UE if one or more of the states are DO NOT SEND.

10. The method of claim 9, wherein transmitting the data comprises:
selecting based on the stored geohashed area, stored content associated with:
the stored geohashed area, a different geohashed area within a predetermined proximity to the stored geohashed area, or a vendor registered with a location in the geohashed area;
and transmitting the selected content.

11. The method of claim 9, wherein the analyzing further comprises performing a spectral flatness analysis on the portion of the audio signature.

12. The method of claim 9, wherein each range segment comprises an increment of 1 KHz, 2 KHz, 5 KHz, or 10 KHz.

13. A method for transmitting data based on audio signatures from user equipment, each step of the method performed by an application stored in a non-transitory memory of a server and executed by a processor, the method comprising:
receiving a plurality of transmissions from a user equipment (UE), wherein each transmission of the plurality of transmissions comprises an audio signature, a geolocation of the audio signature, and a timestamp of the audio signature;
determining, based on the geolocation of the audio signature, when the UE is within a previously stored geohashed area;
determining, based on the determination that the UE is within a previously stored geo hashed area, if the UE is associated with a DO NOT SEND state or if a location type associated with the geohashed area and the timestamp is associated with the DO NOT SEND state;
selecting, subsequent to a determination that neither the UE nor the location type is associated with a DO NOT SEND state, content to transmit to the UE, wherein selecting comprises determining if content from a plurality of vendors stored in a data store is associated with the geohashed area, a vendor within the geohashed area, or a different geo hashed area within a predetermined distance of the UE; and transmitting the selected content to the UE.

14. The method of claim 13, wherein the audio signature comprises a vendor-specific audio signature broadcast by an audio beacon.

15. The method of claim 14, wherein the audio signature is associated with vendor-specific content for a vendor brand or a location of the vendor within the geohashed area or within the different geohashed area.

16. The method of claim 13, wherein content associated with the geohashed area or with the different geohashed area comprises transportation, weather, existing business closures, new business openings, or content associated with financial institutions.

17. The method of claim 13, wherein the UE comprises a phone, a laptop computer, a tablet, a personal digital assistant (PDA), or wearable technology.

18. The method of claim 13, further comprising receiving, from the UE, subsequent to the transmitting, an indication that the selected content was received and viewed.

* * * * *